Aug. 25, 1925.
W. P. OAKES ET AL
1,551,321
LENS
Filed Oct. 25, 1921
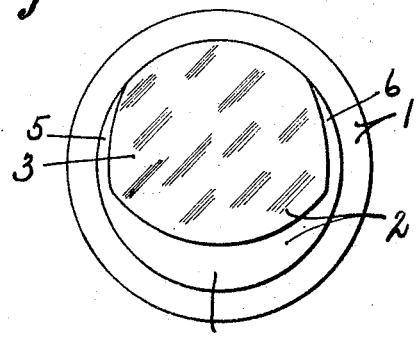
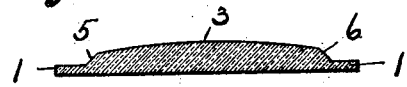
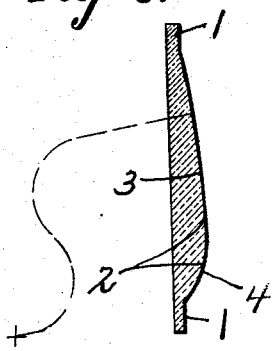
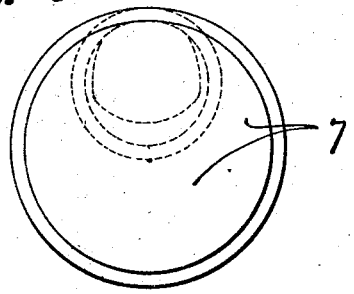
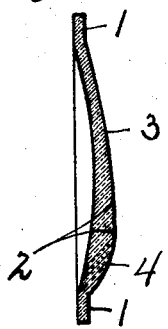
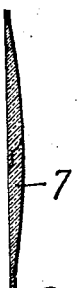
Inventor
W. P. Oakes and
By R. W. Oakes
Denison & Thompson
Attorneys Patented Aug. 25, 1925.

1,551,321

UNITED STATES PATENT OFFICE.

WILLIAM P. OAKES, OF WESTFIELD, AND RAY W. OAKES, OF BUFFALO, NEW YORK.

LENS.

Application filed October 25, 1921. Serial No. 510,315.

*To all whom it may concern:*

Be it known that we, WILLIAM P. OAKES and RAY W. OAKES, of Westfield and Buffalo, respectively, in the counties of Chautauqua and Erie, respectively, in the State of New York, have invented new and useful Improvements in Lenses, of which the following, taken in connection with the accompanying drawings, is a full, clear, and exact description.

This invention relates to certain improvements in lenses, and is designed particularly as a lens for use in connection with headlights for vehicles, automobiles, etc.

It is a common requirement that headlights for motor vehicles should be so formed and arranged that they do not throw a serious or confusing glare more than a certain distance above the ground at a predetermined range. However, it is also quite essential for night driving that the headlight should well light the road for a considerable distance ahead of the vehicle, and the necessity of conforming to the above requirement has unfortunately cut down to a material extent the efficiency of the lamps used and has particularly reduced the extent of the space or road-way illuminated by a lamp of usual size and power, due to the fact that the lenses of such lamps have been formed with refracting and reflecting surfaces of a prismatic formation, which, while directing the main body of the rays somewhat downwardly from or in a horizontal plane, have cut out many and reduced the illuminating power of other of the rays.

The general trend of development along this line has been in the direction of prismatic surfaces that materially reduce the illuminating power of the rays emanating from the source of light, whether reflected or not rather than the utilization of a relatively large spherical surface for concentrating the rays and directing them in the manner desired.

The object of our invention is to produce a lens conforming to the requirements with respect to glare, but which at the same time does not cut down or restrict the illumination, and intensifies and directs the light rays toward a common center.

Other objects and advantages relate to the details of form and construction of the lens, all as will more fully appear from the following description, taken in connection with the accompanying drawings, in which:—

Figure 1 is a front view of the lens.

Figure 2 is a horizontal central section of the same.

Figure 3 is a vertical central section of the same the reversed curved line shown illustrating the radius of curvature of the segment from which the present lens is formed and is here used to show that the radius perpendicular to the flat side of the segment from which this lens is cut would pass at the lower edge of the lens.

Figure 4 is a view similar to Figure 3 of a lens of toric rather than plano-convex formation.

Figure 5 is a view of a segment of a sphere from which a lens of my invention can be formed.

Figure 6 is a vertical central section of Figure 5.

The lens as illustrated, comprises preferably a flat rim part —1— and a lens part —2— of transparent material such as glass, consisting preferably of a main spherical section —3— of such a radius of curvature or lenticular power as may be desired, and formed, molded, ground, or otherwise produced in such a manner that the radius of the sphere perpendicular to the segment of the sphere of which said surface forms a part, lies adjacent the lower edge of the lens. This formation results in the fact that the thickest portion of the surface —3— is at its lower edge.

In order, however, to unite this spherical surface —3— with the rim —1— without an abrupt shoulder of considerable height, at the lower portion, a meniscus shaped section —4— is rounded off so as to have a different radius of curvature than that of the section —3—, with the result that it has a curvature of considerably shorter radius than the spherical surface —3—, thereby shortening and concentrating the rays at the lower portion of the lens. It will be obvious that the form of the rounded-off portion may be varied to suit particular conditions.

This desire to avoid an abrupt shoulder at the edge of the effective surface of the lens part —2— causes the formation of two inclined or rounded off surfaces —5— and —6— at opposite sides of the surface —2—, the surfaces —5— and —6— being in the form of portions of a meniscus, and each merges at its lower portion into the meniscus shaped curved section —4— without interruption of the continuity of the surface.

It is found that with this form of lens the upper portion of the surface —3— refracts slightly downwardly the rays of light passing therethrough and the glare is thereby eliminated, while the rays passing through the lower portion of the surface —3— are intensified and directed slightly downwardly. The lens in this adaptation sends the light towards the thicker edge and the plus nature magnified concentrates and intensifies the rays at the point and in the manner most effective, for illumination of the roadway. In the lens illustrated in the drawing, the spherical surface —3— constitutes perhaps three-quarters of the effective size of a lens surface, but it is obvious that the relative size may be varied within limits.

The rear surface of the lens —2— may be flat, or plano as indicated in Figures 2 and 3, or may be toric, as indicated in Figure 4. As indicated in Figures 5 and 6, this lens may be cut, ground, or otherwise formed from a segment —7— of a sphere in the manner particularly illustrated in dotted lines, Figure 5. That is, the entire lens, or at least the lenticular portion thereof is cut entirely from one side of a diameter of the plane surface of the segment of the sphere, so that it will be obvious that the thickest portion of the lens will be at the bottom portion of the spherical surface without regard to whether that spherical surface extends to the rim —1—, or is spaced therefrom, as in Figure 1.

Although we have shown and described a specific structure as illustrative of a perhaps preferred embodiment of our invention, we do not desire to limit ourselves to the exact form and shape of the lens, or to any particular method of producing the same, as various changes may be made in the details of form and method of production without departing from the invention as set forth in the appended claim.

We claim:

A headlight lens formed from one-half a segment of a glass sphere, and having a substantially circular rim and a spherically shaped surface within the rim having the thicker portion of glass which was adjacent the center of the segment disposed near the lower edge of the lens, and a meniscus shaped surface of shorter radius of curvature than the spherically shaped surface merging the spherically shaped surface with the lower edge of the rim.

In witness whereof we have hereunto set our hands this 14th day of October, 1921.

WILLIAM P. OAKES.
RAY W. OAKES.